(12) United States Patent
Nelson

(10) Patent No.: US 8,274,613 B2
(45) Date of Patent: Sep. 25, 2012

(54) DISPLAY MASKS FOR DISPLAY AND CALIBRATION IN PROJECTOR-BASED DISPLAY SYSTEMS

(75) Inventor: Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 465 days.

(21) Appl. No.: 12/549,044

(22) Filed: Aug. 27, 2009

(65) Prior Publication Data
US 2011/0050873 A1    Mar. 3, 2011

(51) Int. Cl.
*H04N 5/64* (2006.01)

(52) U.S. Cl. .................. 348/744; 348/333.03; 348/802; 348/803

(58) Field of Classification Search .................. 348/745, 348/747, 802, 803, 333.03
See application file for complete search history.

(56) References Cited

U.S. PATENT DOCUMENTS

| 6,729,733 | B1 | 5/2004 | Raskar et al. | |
| 7,119,833 | B2 * | 10/2006 | Jaynes et al. | 348/189 |
| 7,633,528 | B2 * | 12/2009 | Fukushima et al. | 348/211.8 |
| 8,020,997 | B2 * | 9/2011 | Aufranc et al. | 353/30 |

OTHER PUBLICATIONS

Raskar, R., et al., "A Low-Cost Projector Mosaic with Fast Registration", Mitsubishi Electric Research Laboratories, TR-2002-14, Feb. 2002.
Baudisch, P., et al., "Panoramic Viewfinder: Providing a Real-Time Preview to Help Users Avoid Flaws in Panoramic Pictures", Proceedings of the 17th Australia conference on Computer-Human Interaction: Citizens Online: Considerations for Today and the Future, pp. 1-10, 2005.
Alt, H., et al., "Computing the Largest Inscribed Isothetic Rectangle", Proceedings of 1995 Canadian Conference on Computational Geometry (CCCG), pp. 67-72, 1995.

* cited by examiner

*Primary Examiner* — Phuoc Nguyen

(57) ABSTRACT

Methods having corresponding apparatus and computer-readable media comprise: capturing an image of a shape projected upon a display surface; and determining a first rectangle that is the largest inscribed rectangle for the shape, comprising generating a rectangular bounding box containing the shape, dividing the rectangular bounding box vertically into first and second sections, determining a second rectangle that is the largest inscribed rectangle for the shape in the first section of the bounding box, determining a third rectangle that is the largest inscribed rectangle for the shape in the second section of the bounding box, dividing the rectangular bounding box horizontally into third and fourth sections, determining a fourth rectangle that is the largest inscribed rectangle for the shape in a third section of the bounding box, and determining a fifth rectangle that is the largest inscribed rectangle for the shape in the fourth section of the bounding box.

18 Claims, 11 Drawing Sheets

DISPLAY MASKS FOR DISPLAY AND CALIBRATION IN PROJECTOR-BASED DISPLAY SYSTEMS

FIELD

The present disclosure relates to display and camera-based calibration in projector-based display systems. More particularly, the present disclosure relates to generating display masks for the display and calibration.

BACKGROUND

In multi-projector systems, a casually-arranged set of projectors will produce a composite display having an irregular outline due to geometric distortions caused by misalignment of the projectors, keystoning, and the like. These artifacts can be corrected by calibrating the system using a camera. This is true both for tiled displays, where the objective is to create a large display by minimizing projection overlap, as well as for super-bright displays, where the objective is to maximize projection overlap to maximize the brightness of the display. The same is true for single-projector systems.

It is desirable that the composite display have a smooth rectangular shape. It is also desirable to maximize the size of this rectangle, both for multi-projector and single-projector systems. What is needed is a display mask in the form of the largest rectangle that fits within the projection of the system.

SUMMARY

In general, in one aspect, an embodiment features a method comprising: capturing an image of a shape projected upon a display surface; and determining a first rectangle that is the largest inscribed rectangle for the shape in the captured image, comprising generating a rectangular bounding box containing the shape, dividing the rectangular bounding box vertically into first and second sections, determining a second rectangle that is the largest inscribed rectangle for the shape in the first section of the bounding box, determining a third rectangle that is the largest inscribed rectangle for the shape in the second section of the bounding box, dividing the rectangular bounding box horizontally into third and fourth sections, determining a fourth rectangle that is the largest inscribed rectangle for the shape in a third section of the bounding box, and determining a fifth rectangle that is the largest inscribed rectangle for the shape in the fourth section of the bounding box.

Embodiments of the method can include one or more of the following features. Some embodiments comprise selecting a top edge, and a bottom edge, of the first rectangle based on the second and third rectangles; and selecting a left edge, and a right edge, of the first rectangle based on the fourth and fifth rectangles. Some embodiments comprise projecting an image upon the display surface based on the first rectangle. In some embodiments, determining the second rectangle comprises: selecting a middle row of the first section; calculating a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and selecting the sixth rectangle having the greatest area. In some embodiments, determining the third rectangle comprises: selecting a middle row of the second section; calculating a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and selecting the sixth rectangle having the greatest area. In some embodiments, determining the fourth rectangle comprises selecting a middle column of the third section; calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and widths of the sixth rectangles having fewer columns; and selecting the sixth rectangle having the greatest area. In some embodiments, determining the fifth rectangle comprises selecting a middle column of the fourth section, calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and widths of the sixth rectangles having fewer columns; and selecting the sixth rectangle having the greatest area.

In general, in one aspect, an embodiment features an apparatus comprising: a camera to capture an image of a shape projected upon a display surface; and a display mask module to determine a first rectangle that is the largest inscribed rectangle for the shape in the captured image, comprising a bounding box module to generate a rectangular bounding box containing the shape, a section module to divide the rectangular bounding box vertically into first and second sections, and to divide the rectangular bounding box horizontally into third and fourth sections, and a rectangle module to determine a second rectangle that is the largest inscribed rectangle for the shape in the first section of the bounding box, a third rectangle that is the largest inscribed rectangle for the shape in the second section of the bounding box, a fourth rectangle that is the largest inscribed rectangle for the shape in a third section of the bounding box, and a fifth rectangle that is the largest inscribed rectangle for the shape in the fourth section of the bounding box.

Embodiments of the apparatus can include one or more of the following features. Some embodiments comprise an edge module to select a top edge, and a bottom edge, of the first rectangle based on the second and third rectangles, and to select a left edge, and a right edge, of the first rectangle based on the fourth and fifth rectangles. Some embodiments comprise a projector to project an image upon the display surface based on the first rectangle. In some embodiments, the rectangle module comprises: a row module to select a middle row of the first section; an area module to calculate a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and a select module to select the sixth rectangle having the greatest area as the second rectangle. In some embodiments, the rectangle module comprises: a row module to select a middle row of the second section; an area module to calculate a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and a select module to select the sixth rectangle having the greatest area as the third rectangle. In some embodiments, the rectangle module comprises: a column module to select a middle column of the third section; an area module to calculate a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and widths of the sixth rectangles having fewer columns; and a select module to select the sixth rectangle having the greatest area as the fourth rectangle. In some embodiments, the rectangle module comprises: a column module to select a middle column of the fourth section; an area module to calculate a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and widths of the sixth rectangles having fewer columns; and a select module to select the sixth rectangle having the greatest area as the fifth rectangle.

In general, in one aspect, an embodiment features tangible computer-readable media embodying instructions executable by a computer to perform a method comprising: receiving an image of a shape projected upon a display surface; and determining a first rectangle that is the largest inscribed rectangle for the shape in the captured image, comprising generating a rectangular bounding box containing the shape, dividing the rectangular bounding box vertically into first and second sections, determining a second rectangle that is the largest inscribed rectangle for the shape in the first section of the bounding box, determining a third rectangle that is the largest inscribed rectangle for the shape in the second section of the bounding box, dividing the rectangular bounding box horizontally into third and fourth sections, determining a fourth rectangle that is the largest inscribed rectangle for the shape in a third section of the bounding box, and determining a fifth rectangle that is the largest inscribed rectangle for the shape in the fourth section of the bounding box.

Embodiments of the tangible computer-readable media can include one or more of the following features. In some embodiments, the method further comprises: selecting a top edge, and a bottom edge, of the first rectangle based on the second and third rectangles; and selecting a left edge, and a right edge, of the first rectangle based on the fourth and fifth rectangles. In some embodiments, a projector projects an image upon the display surface based on the first rectangle. In some embodiments, determining the second rectangle comprises: selecting a middle row of the first section; calculating a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and selecting the sixth rectangle having the greatest area. In some embodiments, determining the third rectangle comprises: selecting a middle row of the second section; calculating a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and selecting the sixth rectangle having the greatest area. In some embodiments, determining the fourth rectangle comprises: selecting a middle column of the third section; calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and widths of the sixth rectangles having fewer columns; and selecting the sixth rectangle having the greatest area. In some embodiments, determining the fifth rectangle comprises: selecting a middle column of the fourth section; calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and widths of the sixth rectangles having fewer columns; and selecting the sixth rectangle having the greatest area.

The details of one or more implementations are set forth in the accompanying drawings and the description below. Other features will be apparent from the description and drawings, and from the claims.

Figure 1:
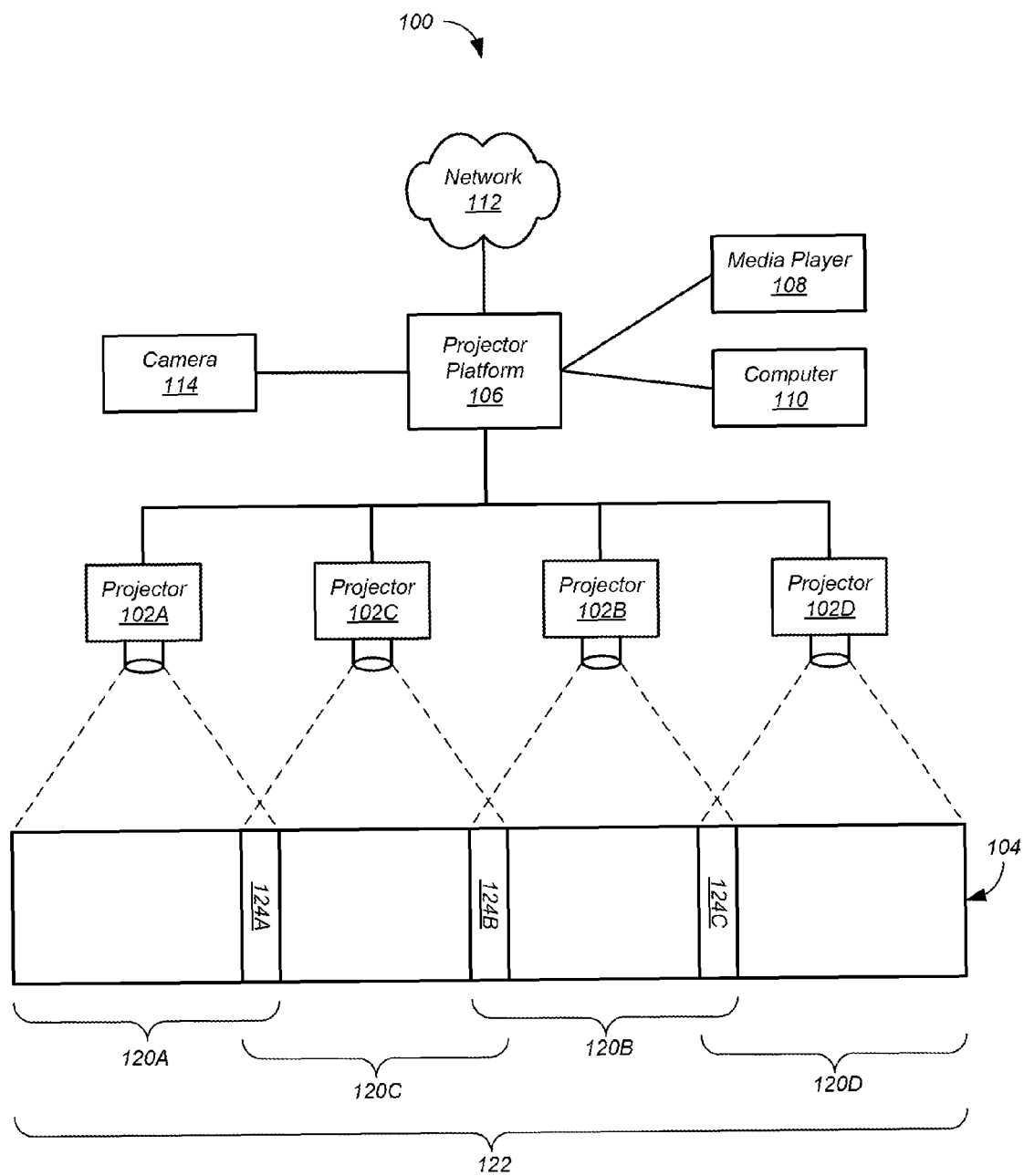
FIG. 1 shows a multi-projector display system according to some embodiments.

The leading digit(s) of each reference numeral used in this specification indicates the number of the drawing in which the reference numeral first appears.

DETAILED DESCRIPTION

The present disclosure relates to display and camera-based calibration in projector-based display systems. During calibration, one or more projectors project calibration images upon a display surface. A camera captures one or more images of each projected calibration image. A projector platform creates a mapping, for each projector, between pixel locations of the camera and pixel locations of the projector. After calibration, the mappings are used to warp images prior to projection. The calibration and warping techniques can be used for multi-projector systems as well as for single-projector systems.

Display masks can be used during playback to limit projections to a selected display area such as a rectangle. Display masks can also be used during calibration, for example to reduce the amounts of data to be processed for calibration. The display mask identifies the area in the captured calibration images corresponding to the display area to be used for projecting images. During calibration of a projector-based display system, the display mask can be used to extract relevant data from the captured calibration images, thereby reducing the amount of data to be processed. However, the display masks can have other uses as well.

According to embodiments of the present invention, the display mask is generated as follows. An image of a shape projected upon the display surface is captured, for example by a digital camera. The shape is the projection created by one or more projectors. Then the largest rectangle that will fit within the shape in the captured image is determined according to the process described below.

First a rectangular bounding box containing the shape is generated. Then four rectangles are generated, including a first rectangle that is the largest rectangle within the shape in the right half of the bounding box, a second rectangle that is the largest rectangle within the shape in the left half of the bounding box, a third rectangle that is the largest rectangle within the shape in the top half of the bounding box, and the fourth rectangle that is the largest rectangle within the shape in a bottom half of the bounding box. Then the top and bottom edges of the largest rectangle are selected based on the first and second rectangles. The left and right edges of the largest rectangle are selected based on the third and fourth rectangles.

These four edges are the edges of the largest rectangle that fits within the shape in the captured image. An image can be projected upon the display surface based on this rectangle to produce a composite display having the desired smooth rectangular shape.

FIG. 1 shows a multi-projector display system 100 according to some embodiments. System 100 includes four projectors 102A-102D aimed at a display surface 104. Of course, other numbers of projectors 102 can be employed. For example, a single projector 102 can be used. Data is provided to projectors 102 by a projector platform 106, which can obtain source input from a media player 108, a computer 110, a source connected by a network 112 such as the Internet, and the like. For calibration, system 100 includes a digital still camera 114.

In one embodiment, system 100 includes four projectors 102 and projector platform 106 is implemented as a personal computer (PC) configured with a central processing unit (CPU) and graphic processing units (GPU) providing four video outputs each connected to one of projectors 102. An optional capture card provides video input from sources such as computer 110, media player 108, and the like. Digital still camera 114 is attached to the PC for the calibration process. In other embodiments, a video camera may be used for the calibration process. After calibration, digital still camera 114 may be removed or used as a media input device by projector platform 106.

Projectors 102A-102D produce respective component projections 120A-120D upon display surface 104. Together component projections 120A-120D form a single composite projection 122. Note that component projections 120 overlap in regions 124A-124C.

Figure 2:
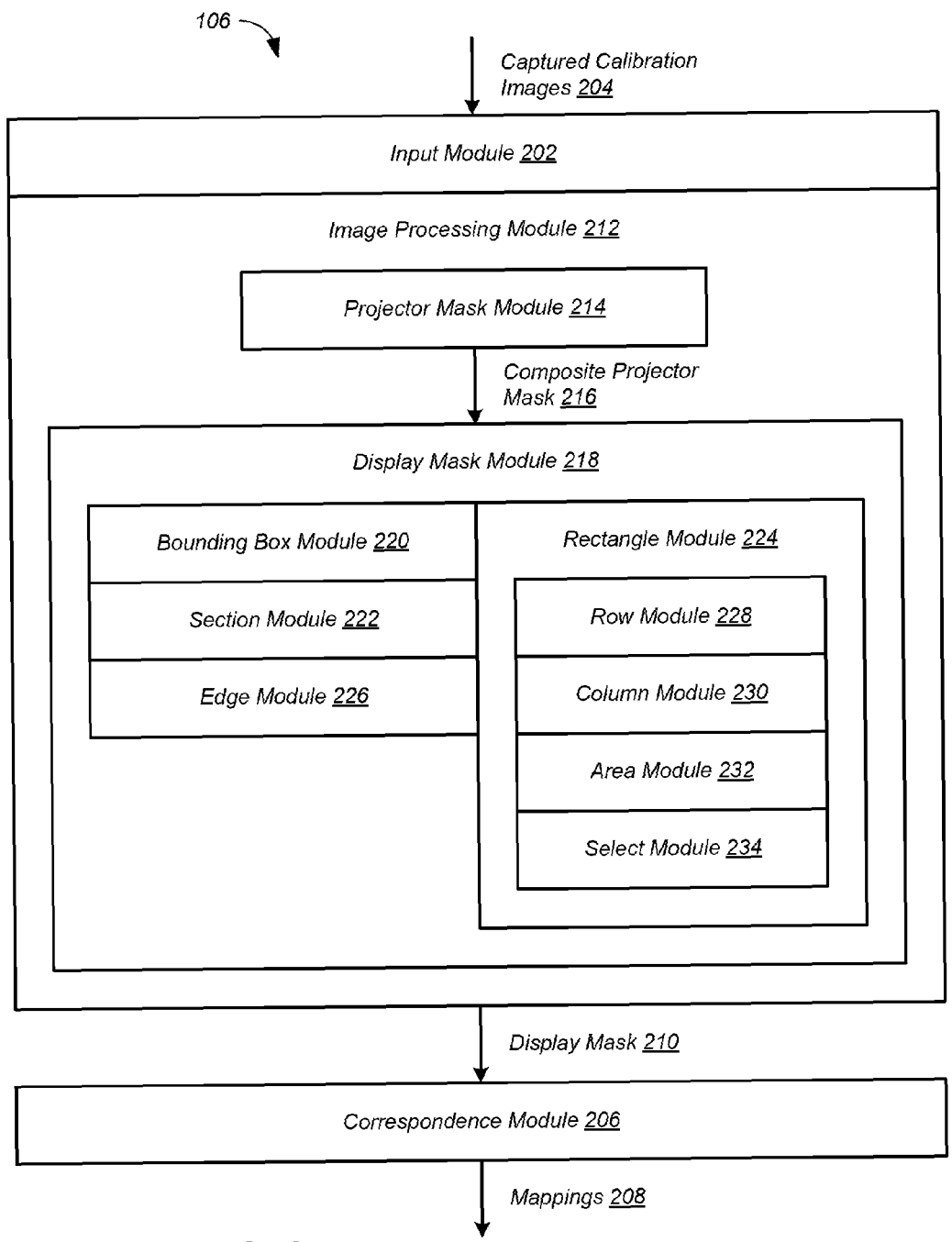
FIG. 2 shows elements of the projector platform of FIG. 1 for calibrating projectors 102 according to some embodiments.

FIG. 2 shows elements of projector platform 106 of FIG. 1 for calibrating projectors 102 according to some embodiments. Although in the described embodiments, apparatus elements are presented in one arrangement, other embodiments may feature other arrangements, as will be apparent to one skilled in the relevant arts based on the disclosure and teachings provided herein. For example, the apparatus elements can be implemented in hardware, software, or combinations thereof.

Referring to FIG. 2, projector platform 106 includes an input module 202 adapted to receive one or more captured calibration images 204 from camera 114 and a correspondence module 206 adapted to generate mappings 208 between pixel locations of camera 114 and pixel locations of projectors 102 based on a display mask 210. Projector platform 106 also includes an image processing module 212.

Image processing module 212 includes a projector mask module 214 to generate a composite projector mask 216 based on captured calibration images 204 and a display mask module 218 to generate display mask 210 based on composite projector mask 216. Display mask module 218 includes a bounding box module 220, a section module 222, a rectangle module 224, and an edge module 226. Rectangle module 224 includes a row module 228, a column module 230, an area module 232, and a select module 234.

Figure 3A:
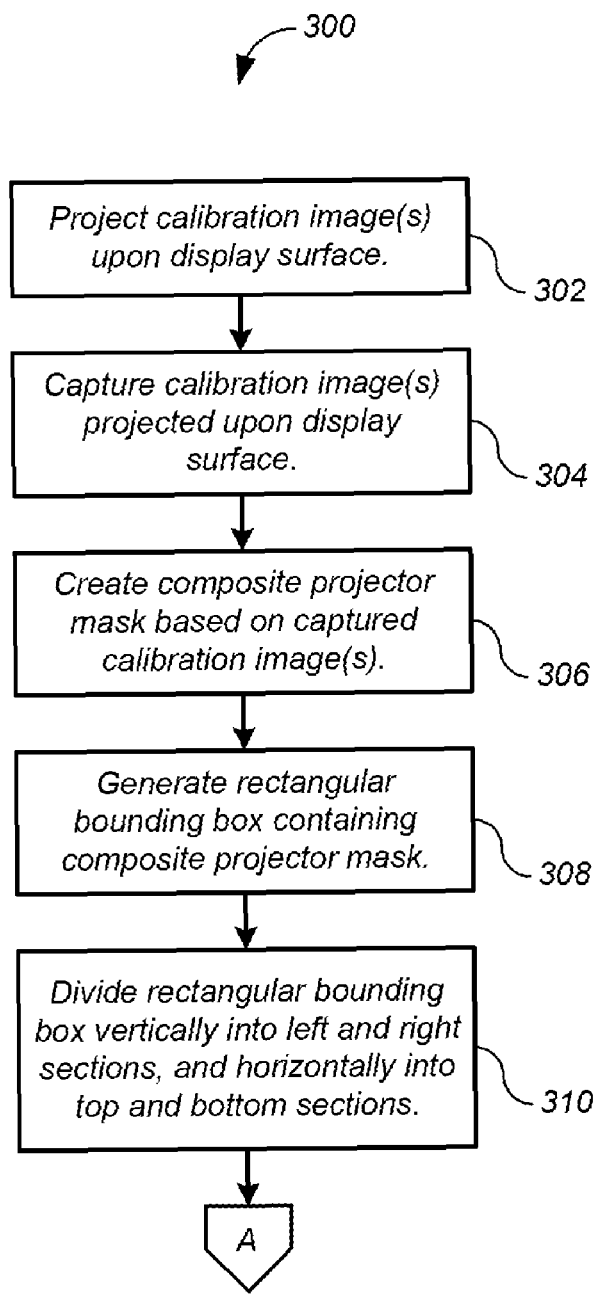
FIGS. 3A-B show a process for the projector platform of FIG. 2 for generating and using a display mask according to some embodiments.
Figure 3B:
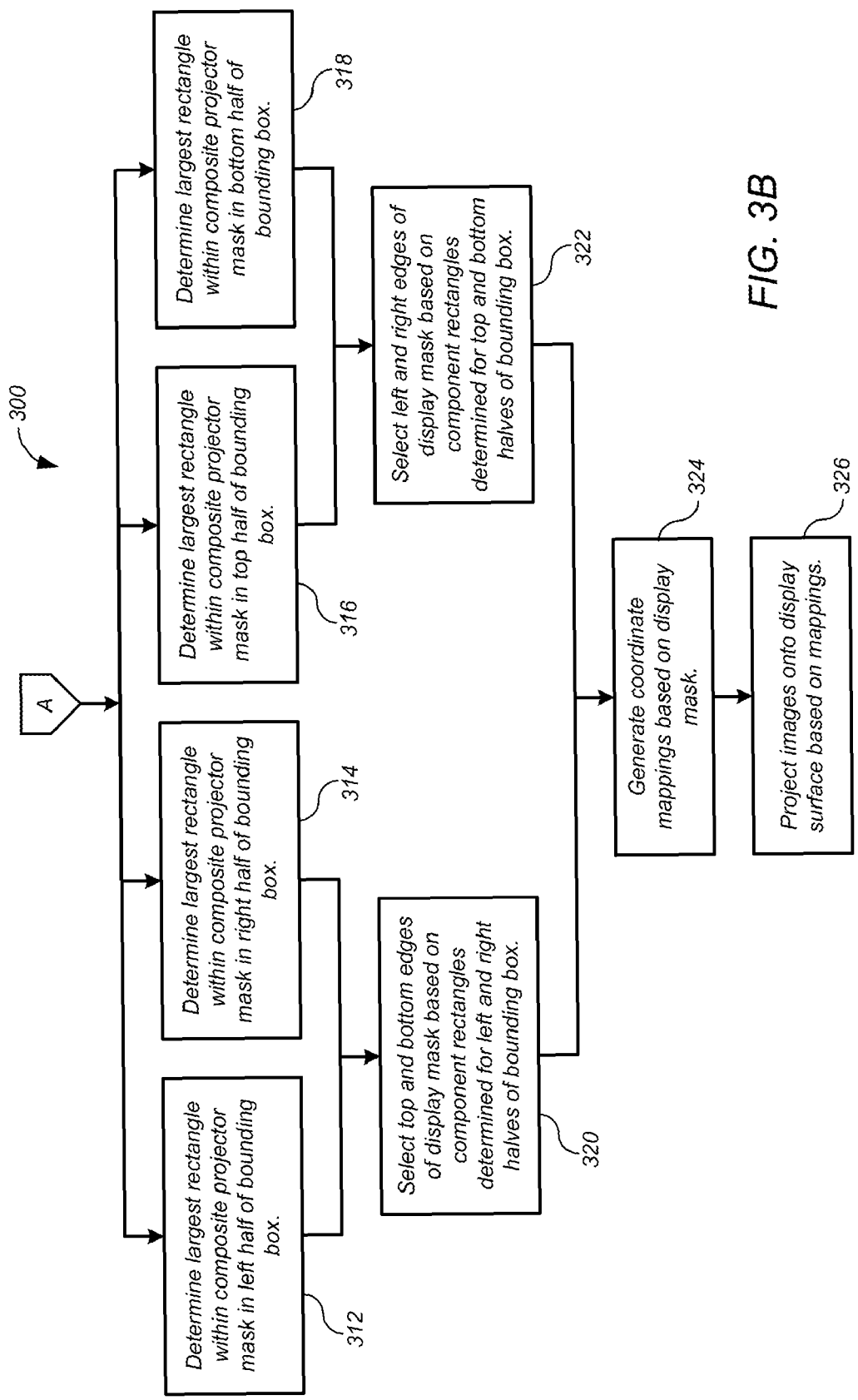

FIGS. 3A-B show a process 300 for projector platform 106 of FIG. 2 for generating and using a display mask 210 according to some embodiments. Although in the described embodiments, the elements of the processes disclosed herein are presented in one arrangement, other embodiments may feature other arrangements, as will be apparent to one skilled in the relevant arts based on the disclosure and teachings provided herein. For example, in various embodiments, some or all of the steps of the disclosed processes can be executed in a different order, concurrently, and the like.

Figure 4:
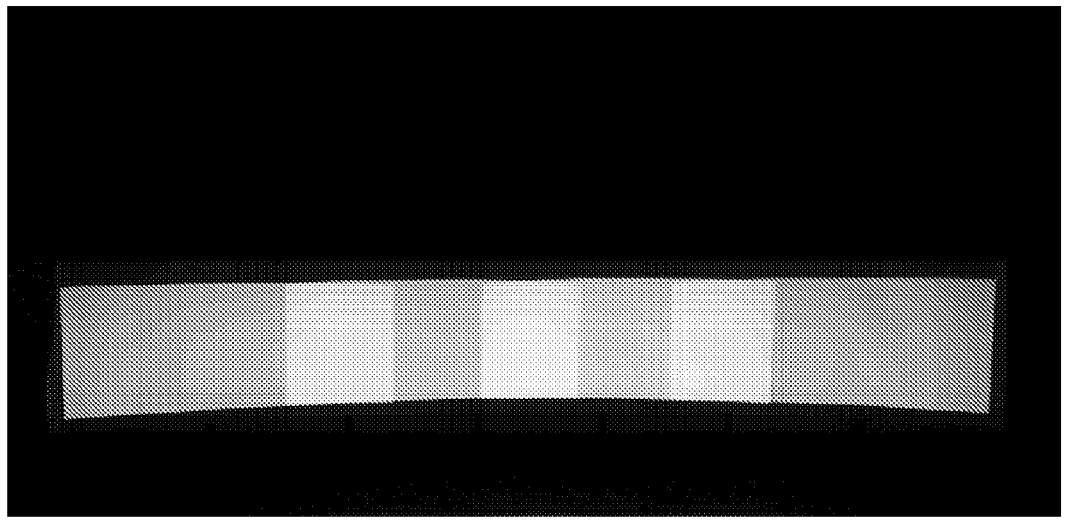
FIG. 4 shows an example captured calibration image for a tiled display created by four projectors.
Figure 5:
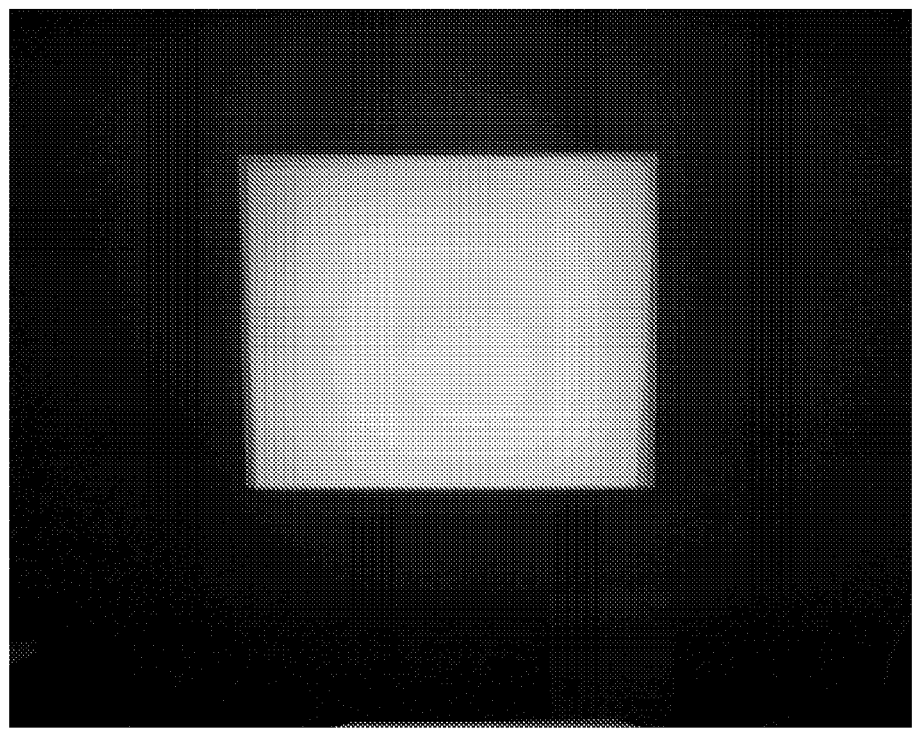
FIG. 5 shows an example captured calibration image for a super-bright display created by multiple projectors.

Referring to FIGS. 3A-B, process 300 begins with data capture. Projector 102 projects one or more calibration images upon display surface 104 (step 302). For example, the calibration images can include one or more primary colors, alone or in combination, and the like. For clarity, the pixel locations in the projector coordinate space are referred to herein as "projector pixel locations" or "projector pixels." Camera 114 captures the calibration images projected upon display surface 104 (step 304). The captured images are referred to herein collectively as calibration images 204. FIG. 4 shows an example captured calibration image 204 for a tiled display created by four projectors 102. FIG. 5 shows an example captured calibration image 204 for a super-bright display created by multiple projectors 102.

Each captured calibration image 204 conforms to a virtual display space that includes a plurality of pixel locations. In some embodiments, the virtual display space is defined by the frame of camera 114. That is, virtual display space has the same resolution and dimensions as the frame of camera 114.

Therefore, for clarity, the pixel locations in the virtual display space are referred to herein as "camera pixel locations" or "camera pixels." In other embodiments, other virtual display spaces can be used. The calculations described herein are performed in the virtual display space in units of camera pixels. Of course, other spaces and units can be used instead.

After data capture, the data is processed by projector platform 106. Input module 202 of projector platform 106 receives captured calibration images 204. Projector mask module 214 of image processing module 212 processes captured calibration images 204 to create composite projector mask 216 (step 306). The processing occurs in the virtual display space, for example, at the resolution and size of the images captured by camera 114. Any process can be used to create composite projector mask 216. For example, projector mask module 214 creates a component projector mask for each projector 102. The component projector masks are combined to create composite projector mask 216. In the case of a tiled display such as that of FIG. 4, composite projector mask 216 is the union of the component projector masks. For a super-bright configuration such as that of FIG. 5, composite projector mask 216 is the intersection of the component projector masks. However, the present disclosure is independent of the manner in which composite projector mask 216 is created.

Figure 6:
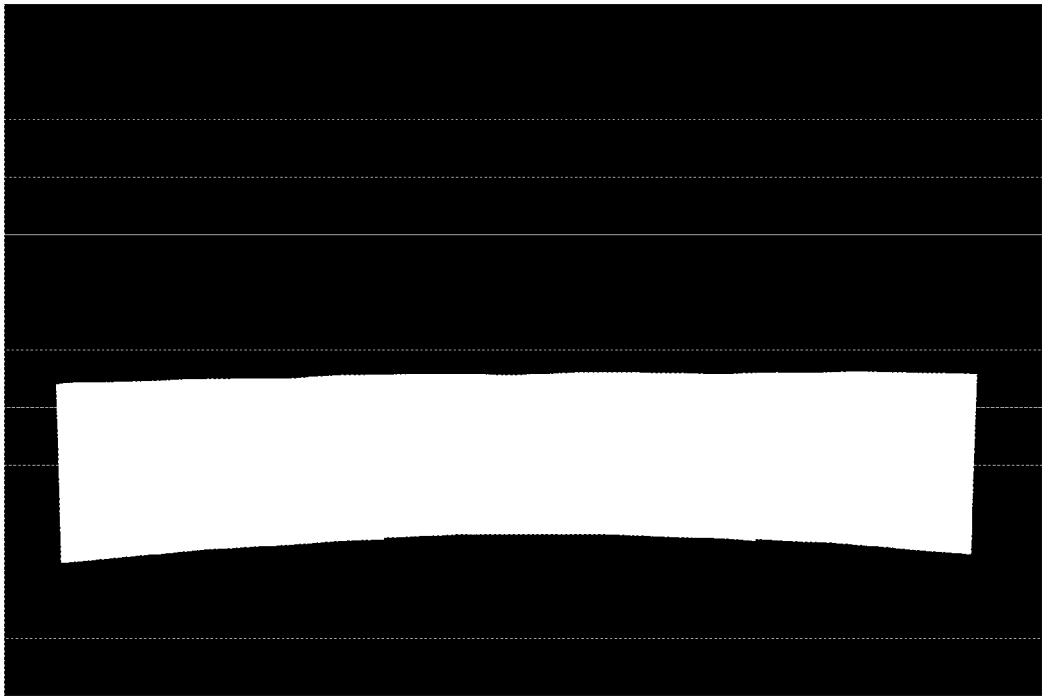
FIG. 6 shows an example composite projector mask for the tiled display of FIG. 4.

FIG. 6 shows an example composite projector mask 216 for the tiled display of FIG. 4. The white shape in FIG. 6 represents a composite projection. Because projectors 102 are not required to be precisely placed before calibration, the composite projection is an irregular shape. Display mask 210 is the largest inscribed rectangle for the shape, that is, the largest rectangle that fits inside the shape.

Next, display mask module 218 creates display mask 210 based on composite projector mask 216. Process 300 is described in terms of a tiled display such as that of FIG. 4. However, process 300 can be applied to super-bright displays such as that of FIG. 5, gridded displays having multiple rows and columns of projections, single-projector displays, and the like, as will be apparent after reading this disclosure.

First, bounding box module 220 generates a rectangular bounding box containing composite projector mask 216 (step 308). Any process can be used to create the rectangular bounding box. The present disclosure is independent of the manner in which the rectangular bounding box is created.

Figure 7:
FIG. 7 shows the composite projector mask of FIG. 6, along with a bounding box, shown in white, and center row and column, shown in black.

Section module 222 divides the rectangular bounding box vertically into left and right sections, and horizontally into top and bottom sections (step 310). For example, section module 222 calculates the center row and column of the bounding box, thereby dividing the bounding box into top and bottom halves, and left and right halves. However, while embodiments are described as using the center row and center column, other rows and columns can be used instead. FIG. 7 shows the composite projector mask of FIG. 6, along with the bounding box, shown in white, and the center row and column, shown in black.

Next rectangle module 224 determines the largest rectangle within composite projector mask 216 in the left half of the bounding box (step 312), the largest rectangle within composite projector mask 216 in the right half of the bounding box (step 314), the largest rectangle within composite projector mask 216 in the top half of the bounding box (step 316), and the largest rectangle within composite projector mask 216 in the bottom half of the bounding box (step 318). For clarity, these rectangles are referred to herein as "component rectangles," while the rectangle representing display mask 210 is referred to as the "composite rectangle."

Figure 8:
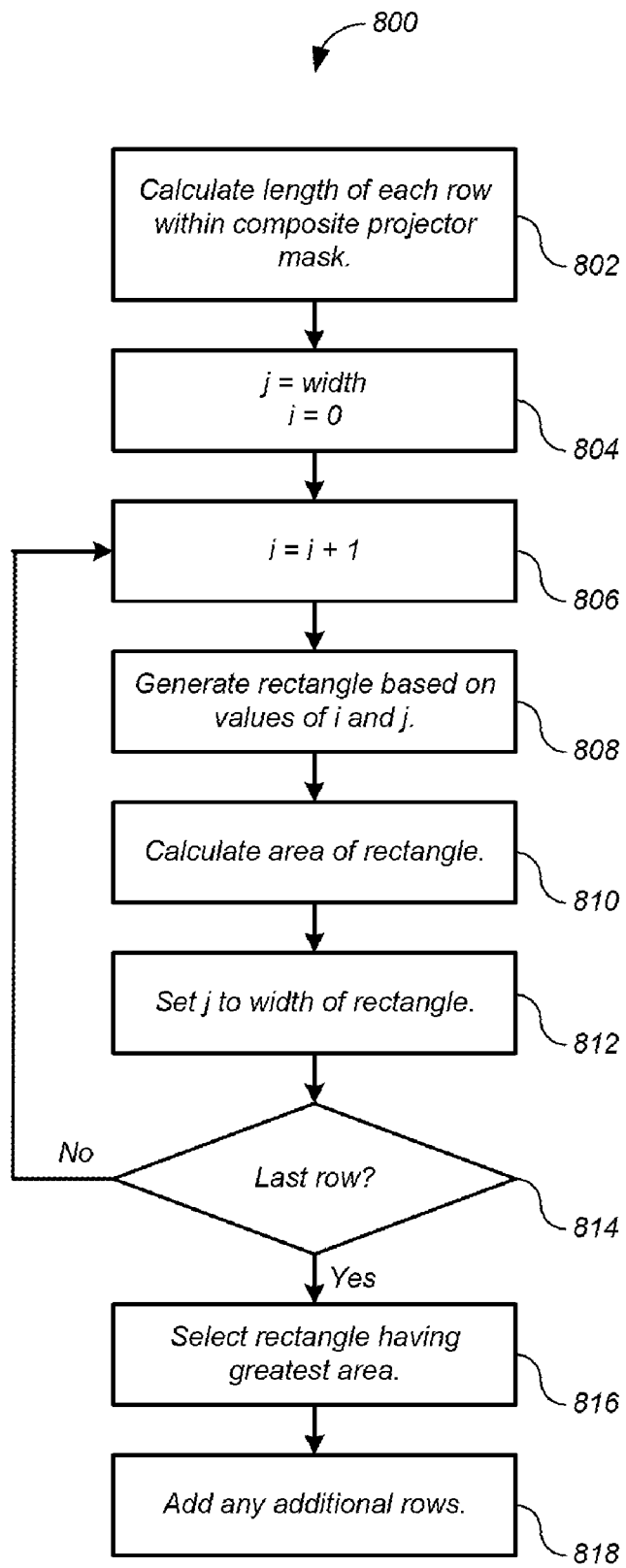
FIG. 8 shows a process for the rectangle module of FIG. 2 for determining the component rectangle for the right half of the bounding box according to some embodiments.

FIG. 8 shows a process 800 for rectangle module 224 of FIG. 2 for determining the component rectangle for the right half of the bounding box according to some embodiments. Referring to FIG. 8, rectangle module 224 calculates the length of each row within composite projector mask 216 (step 802). Any rows not within composite projector mask 216 at the center column of the bounding box are omitted. For example, the length of such a row can be recorded as zero, indicating that the row should not be processed.

A Cartesian coordinate system (j, i) is used for process 800, with the origin at the center of the bounding box, with values of i increasing towards the top of the bounding box, and with values of j increasing towards the right side of the bounding box. Referring again to FIG. 8, variable j is initialized to the width of the right half of the bounding box, and variable i is initialized to zero (step 804). Next the value of i is incremented (step 806).

Figure 9:
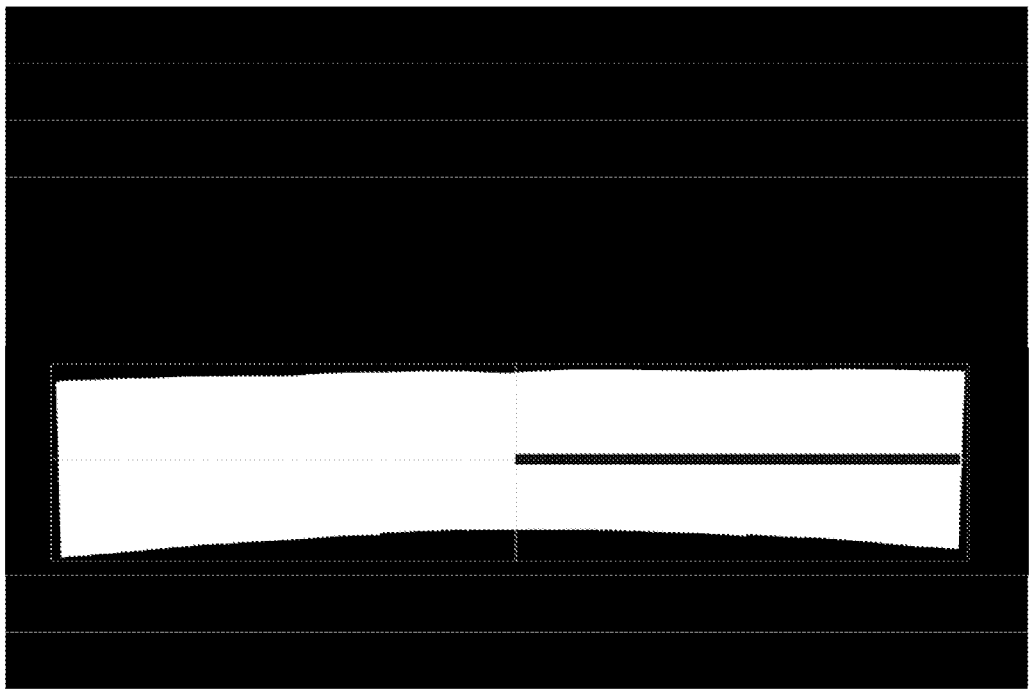
FIG. 9 shows a rectangle generated near the beginning of the process of FIG. 8.

Rectangle module 224 then generates a rectangle based on the values of i and j (step 808). In particular, row module 228 selects the rows that are located i units from the center row as the top and bottom edges of the rectangle. The width of the rectangle is selected as the least of j and the lengths of the selected rows. Area module 232 then calculates the area of that rectangle, which is the product of 2i and the width (step 810). FIG. 9 shows a rectangle generated near the beginning of process 800 of FIG. 8.

Subsequent rectangles are generated, and their areas calculated, working outward from the center row (steps 806 et seq.). To ensure the widths of these rectangles do not grow during processing, variable j is set to the width of the last-processed rectangle before the next rectangle is generated (step 812).

Figure 10:
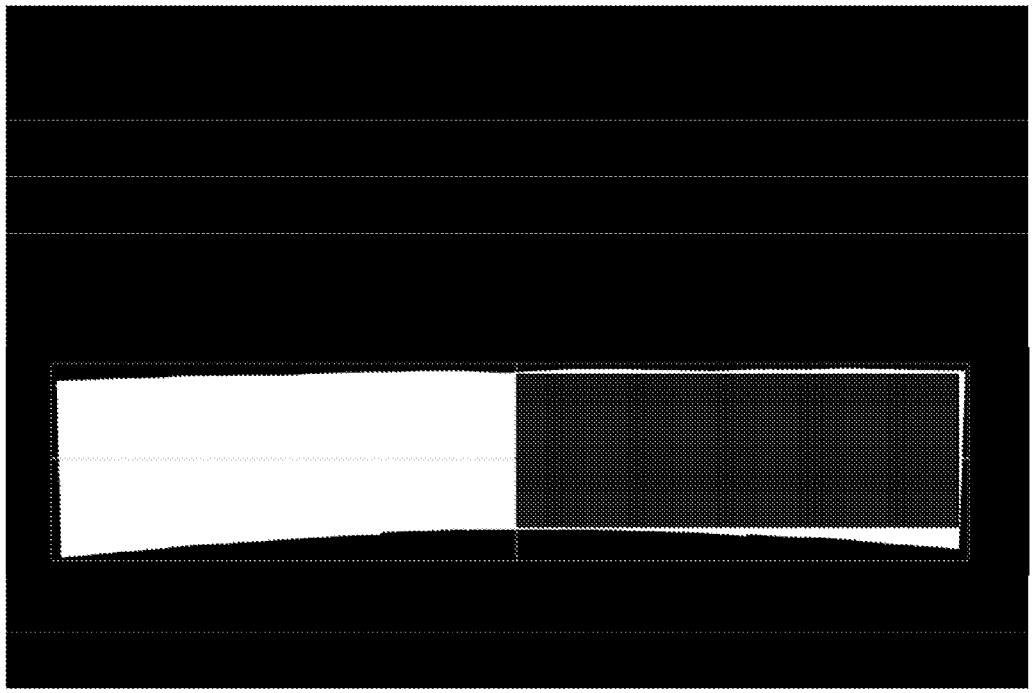
FIG. 10 shows the right component rectangle generated by the process of FIG. 8.

When all of the rectangles have been generated (step 814), select module 234 selects the rectangle having the greatest area (step 816). If composite projector mask 216 is not evenly distributed around the center row, there may be cases where additional rows can be added to that rectangle. Any remaining rows at the top or the bottom of composite projector mask 216 that are at least as wide as the rectangle are added to the rectangle (step 818). FIG. 10 shows the right component rectangle generated by process 800 of FIG. 8.

Figure 11:
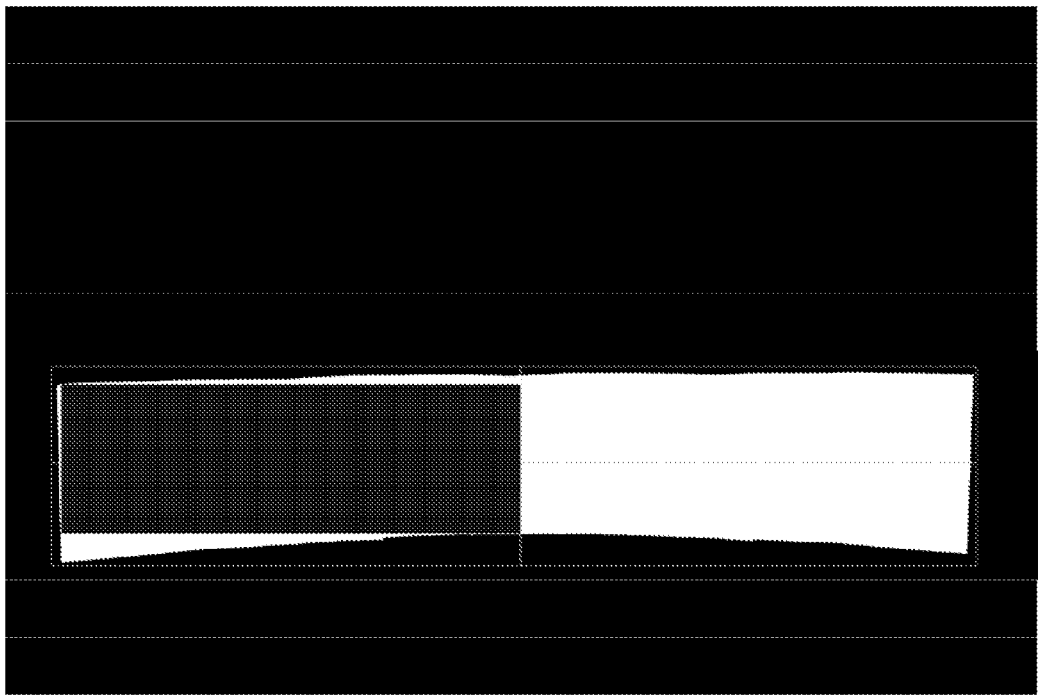
FIG. 11 shows an example left component rectangle for the composite projector mask of FIG. 6.
Figure 12:
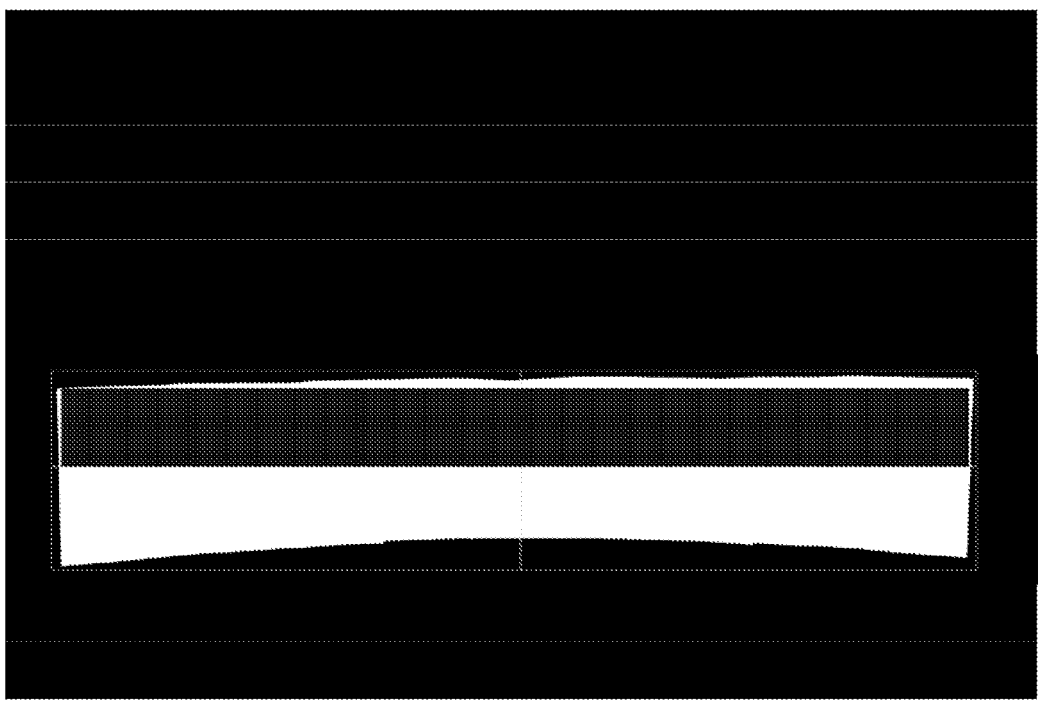
FIG. 12 shows an example top component rectangle for the composite projector mask of FIG. 6.
Figure 13:
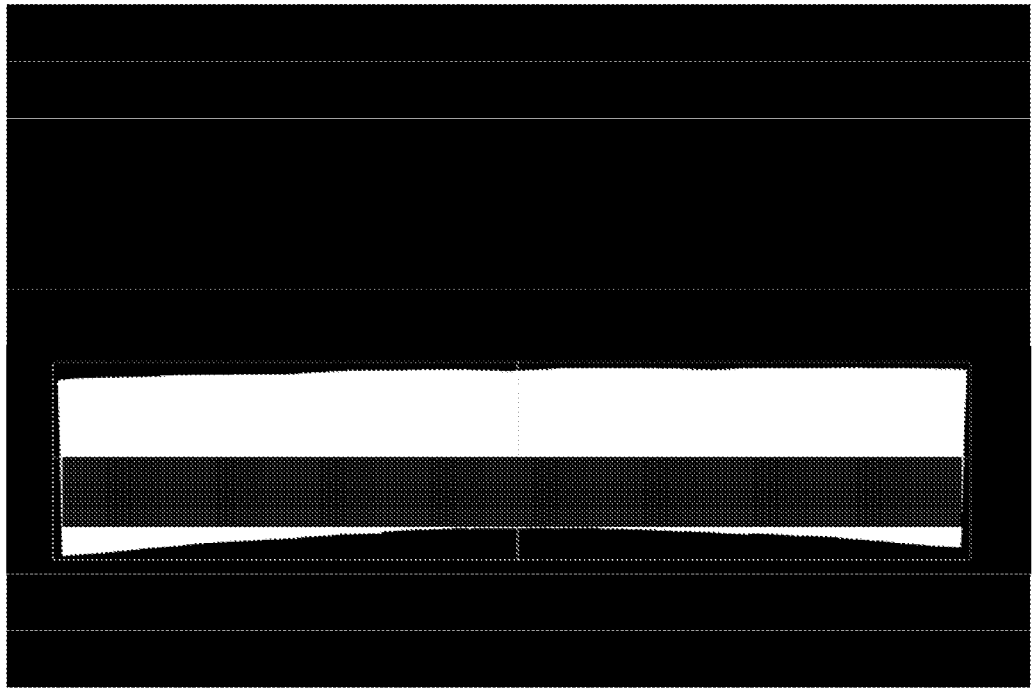
FIG. 13 shows an example bottom component rectangle for the composite projector mask of FIG. 6.

The remaining three component rectangles are generated in a similar manner, with column module 230 performing similar functions for the top and bottom component rectangles as row module 228 performs for the left and right component rectangles. FIG. 11 shows an example left component rectangle for composite projector mask 216 of FIG. 6. FIG. 12 shows an example top component rectangle for composite projector mask 216 of FIG. 6. FIG. 13 shows an example bottom component rectangle for composite projector mask 216 of FIG. 6.

Referring again to FIGS. 3A-B, based on the component rectangles, edge module 226 generates the composite rectangle, that is, the largest inscribed rectangle for composite projector mask 216. Edge module 226 selects the top and bottom edges of the composite rectangle based on the component rectangles determined for the left and right halves of the bounding box (step 320). In particular, edge module 226 compares the top edges of the left and right component rectangles, and selects the edge furthest from the top edge of the bounding box as the top edge of the composite rectangle. Edge module 226 also compares the bottom edges of the component left and right rectangles, and selects the edge furthest from the bottom edge of the bounding box as the bottom edge of the composite rectangle.

Figure 15:
FIG. 15 shows a display mask generated based on the component rectangles of FIGS. 10-13.
Figure 14A:
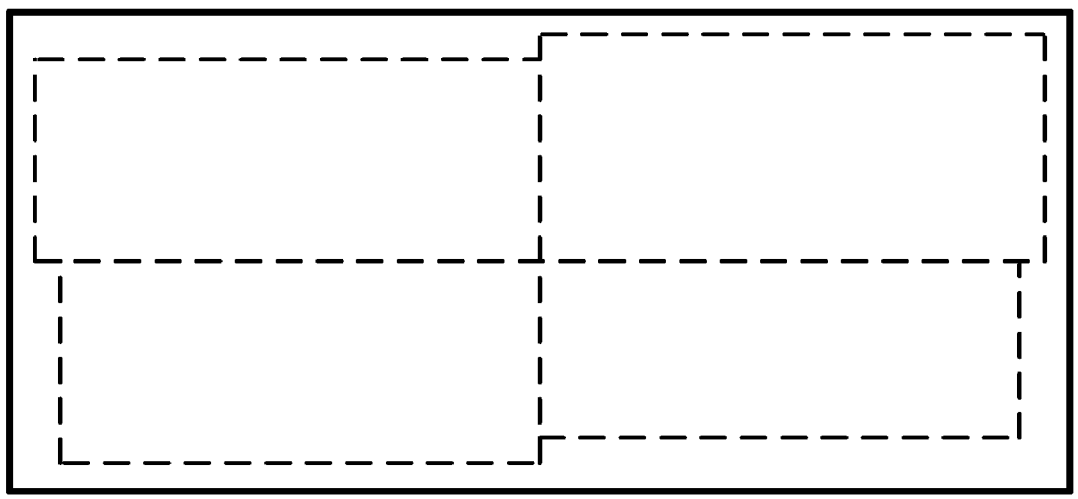
FIGS. 14A-B graphically illustrates a technique for generating a composite rectangle based on component rectangles.
Figure 14B:
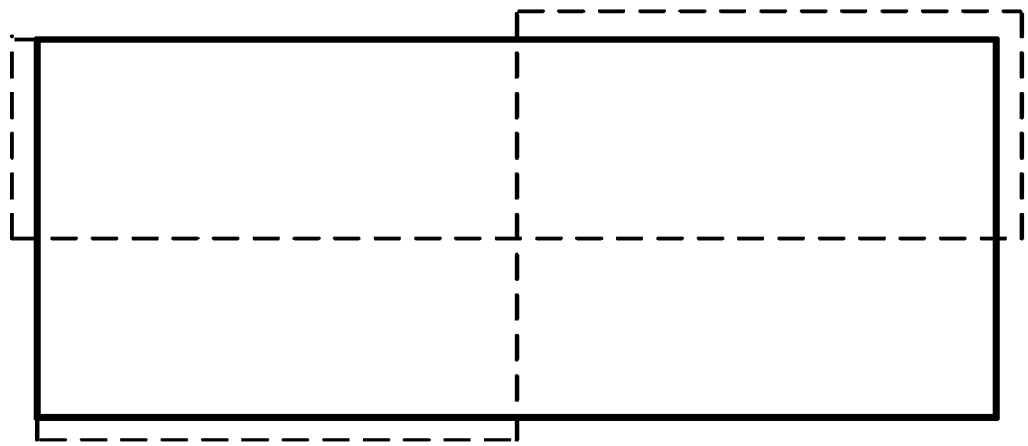

Edge module 226 selects the left and right edges of the composite rectangle based on the component rectangles determined for the top and bottom halves of the bounding box (step 322). In particular, edge module 226 compares the left edges of the top and bottom component rectangles, and selects the edge furthest from the left edge of the bounding box as the left edge of the composite rectangle. Edge module 226 also compares the right edges of the top and bottom component rectangles, and selects the edge furthest from the right edge of the bounding box as the right edge of the composite rectangle. FIGS. 14A-B illustrate this technique graphically. FIG. 14A shows example left, right, top and bottom component rectangles as dashed lines and a bounding box as a solid line. FIG. 14B omits the bounding box, and instead shows a composite rectangle for the component rectangles as a solid line. FIG. 15 shows a display mask 210 generated based on the component rectangles of FIGS. 10-13.

After generating a display mask 210, coordinate mappings 208 can be generated for each projector 102. For each projector 102, correspondence module 206 generates the coordinate mappings 208 based on display mask 210 and/or the component projector masks (step 324). In particular, correspondence module 206 uses display mask 210 and/or the component projector masks to isolate the relevant data in captured calibration images 204, and determines the correspondence between projector pixels and camera pixels based upon that data. Mappings 208 can be generated according to conventional techniques. For example, projector 102 can be used to project one or more calibration images upon display surface 104. The calibration images can include horizontal and vertical lines and stripes. The stripes can be gray coded. Of course, other sorts of calibration images can be used. Camera 114 captures the calibration images. Display mask 210 and/or the component projector masks are used to extract the data from captured calibration images 204. Mapping 208 are generated based on the extracted data.

Once mappings 208 are generated for projectors 102, mappings 208, display mask 210, and projectors 102 can be used to project images such as still images and video frames that conform to the virtual display space. Of course, any image can be used after mapping that image into the virtual display space. Projector 102 projects these images onto display surface 104 based on mappings 208 and display mask 210 (step 326). Display mask 210 is used to limit the projections to a selected display area such as a rectangle.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of this disclosure. Accordingly, other implementations are within the scope of the following claims.

What is claimed is:

1. A method comprising:
    capturing an image of a shape projected upon a display surface; and
    using a processor to generate a rectangular bounding box containing the shape and determine a first rectangle that is the largest inscribed rectangle for the shape in the captured image by
    dividing the rectangular bounding box vertically into first and second sections,
    determining a second rectangle that is the largest inscribed rectangle for the shape in the first section of the bounding box,
    determining a third rectangle that is the largest inscribed rectangle for the shape in the second section of the bounding box,
    dividing the rectangular bounding box horizontally into third and fourth sections,
    determining a fourth rectangle that is the largest inscribed rectangle for the shape in a third section of the bounding box,
    determining a fifth rectangle that is the largest inscribed rectangle for the shape in the fourth section of the bounding box,
    selecting a top edge, and a bottom edge, of the first rectangle based on the second and third rectangles; and
    selecting a left edge, and a right edge, of the first rectangle based on the fourth and fifth rectangles.

2. The method of claim 1, further comprising:
    projecting an image upon the display surface based on the first rectangle.

3. The method of claim 1, wherein determining the second rectangle comprises:
    selecting a middle row of the first section;
    calculating a respective area of each of a plurality of sixth rectangles, wherein top and bottom rows of each sixth rectangle are equidistant from the middle row, and wherein a width of each sixth rectangle is a least of
    a maximum distance along the top row within the shape,
    a maximum distance along the bottom row within the shape, and
    widths of the sixth rectangles having fewer rows; and
    selecting the sixth rectangle having the greatest area.

4. The method of claim 1, wherein determining the third rectangle comprises:
    selecting a middle row of the second section;
    calculating a respective area of each of a plurality of sixth rectangles, wherein top and bottom rows of each sixth rectangle are equidistant from the middle row, and wherein a width of each sixth rectangle is a least of
    a maximum distance along the top row within the shape, a maximum distance along the bottom row within the shape, and widths of the sixth rectangles having fewer rows; and selecting the sixth rectangle having the greatest area.

5. The method of claim 1, wherein determining the fourth rectangle comprises:

selecting a middle column of the third section;

calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and heights of the sixth rectangles having fewer columns; and selecting the sixth rectangle having the greatest area.

6. The method of claim 1, wherein determining the fifth rectangle comprises:

selecting a middle column of the fourth section;

calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and heights of the sixth rectangles having fewer columns; and selecting the sixth rectangle having the greatest area.

7. An apparatus comprising:

a camera to capture an image of a shape projected upon a display surface; and a bounding box module to generate a rectangular bounding box containing the shape, a display mask module to determine a first rectangle that is the largest inscribed rectangle for the shape in the captured image, comprising a section module to divide the rectangular bounding box vertically into first and second sections, and to divide the rectangular bounding box horizontally into third and fourth sections, and a rectangle module to determine a second rectangle that is the largest inscribed rectangle for the shape in the first section of the bounding box, a third rectangle that is the largest inscribed rectangle for the shape in the second section of the bounding box, a fourth rectangle that is the largest inscribed rectangle for the shape in a third section of the bounding box, a fifth rectangle that is the largest inscribed rectangle for the shape in the fourth section of the bounding box, and an edge module to select a top edge, and a bottom edge, of the first rectangle based on the second and third rectangles, and to select a left edge, and a right edge, of the first rectangle based on the fourth and fifth rectangles.

8. The apparatus of claim 7, further comprising:

a projector to project an image upon the display surface based on the first rectangle.

9. The apparatus of claim 7, wherein the rectangle module comprises:

a row module to select a middle row of the first section;

an area module to calculate a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and a select module to select the sixth rectangle having the greatest area as the second rectangle.

10. The apparatus of claim 7, wherein the rectangle module comprises:

a row module to select a middle row of the second section;

an area module to calculate a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and a select module to select the sixth rectangle having the greatest area as the third rectangle.

11. The apparatus of claim 7, wherein the rectangle module comprises:

a column module to select a middle column of the third section;

an area module to calculate a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and heights of the sixth rectangles having fewer columns; and a select module to select the sixth rectangle having the greatest area as the fourth rectangle.

12. The apparatus of claim 7, wherein the rectangle module comprises:

a column module to select a middle column of the fourth section;

an area module to calculate a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and heights of the sixth rectangles having fewer columns; and a select module to select the sixth rectangle having the greatest area as the fifth rectangle.

13. Tangible, non-transitory computer-readable media embodying instructions executable by a computer to perform a method comprising:

receiving an image of a shape projected upon a display surface; and using a processor to generate a rectangular bounding box containing the shape and determine a first rectangle that is the largest inscribed rectangle for the shape in the captured image by dividing the rectangular bounding box vertically into first and second sections, determining a second rectangle that is the largest inscribed rectangle for the shape in the first section of the bounding box, determining a third rectangle that is the largest inscribed rectangle for the shape in the second section of the bounding box, dividing the rectangular bounding box horizontally into third and fourth sections, determining a fourth rectangle that is the largest inscribed rectangle for the shape in a third section of the bounding box, determining a fifth rectangle that is the largest inscribed rectangle for the shape in the fourth section of the bounding box, selecting a top edge, and a bottom edge, of the first rectangle based on the second and third rectangles; and selecting a left edge, and a right edge, of the first rectangle based on the fourth and fifth rectangles.

14. The tangible, non-transitory computer-readable media of claim 13:

wherein a projector projects an image upon the display surface based on the first rectangle.

15. The tangible, non-transitory computer-readable media of claim 13, wherein determining the second rectangle comprises:

selecting a middle row of the first section;

calculating a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and selecting the sixth rectangle having the greatest area.

16. The tangible, non-transitory computer-readable media of claim 13, wherein determining the third rectangle comprises:

selecting a middle row of the second section;

calculating a respective area of each of a plurality of sixth rectangles, wherein top and bottom rows of each sixth rectangle are equidistant from the middle row, and wherein a width of each sixth rectangle is a least of a maximum distance along the top row within the shape, a maximum distance along the bottom row within the shape, and widths of the sixth rectangles having fewer rows; and selecting the sixth rectangle having the greatest area.

17. The tangible, non-transitory computer-readable media of claim 13, wherein determining the fourth rectangle comprises:

selecting a middle column of the third section;

calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and heights of the sixth rectangles having fewer columns; and selecting the sixth rectangle having the greatest area.

18. The tangible, non-transitory computer-readable media of claim 13, wherein determining the fifth rectangle comprises:

selecting a middle column of the fourth section;

calculating a respective area of each of a plurality of sixth rectangles, wherein left and right columns of each sixth rectangle are equidistant from the middle column, and wherein a height of each sixth rectangle is a least of a maximum distance along the left column within the shape, a maximum distance along the right column within the shape, and heights of the sixth rectangles having fewer columns; and selecting the sixth rectangle having the greatest area.

* * * * *